US011446698B2

(12) United States Patent
Jordan

(10) Patent No.: US 11,446,698 B2
(45) Date of Patent: Sep. 20, 2022

(54) PROCESS FOR SPRAY-APPLYING A NON-AQUEOUS TWO-COMPONENT FILLER COATING COMPOSITION ONTO A SUBSTRATE

(71) Applicant: Akzo Nobel Coatings International B.V., Amsterdam (NL)

(72) Inventor: Stuart Jordan, Stanley (GB)

(73) Assignee: Akzo Nobel Coatings International B.V., Amsterdam (NL)

( * ) Notice: Subject to any disclaimer, the term of this patent is extended or adjusted under 35 U.S.C. 154(b) by 0 days.

(21) Appl. No.: 17/413,626

(22) PCT Filed: Sep. 20, 2019

(86) PCT No.: PCT/EP2019/075310
§ 371 (c)(1),
(2) Date: Jun. 14, 2021

(87) PCT Pub. No.: WO2020/126134
PCT Pub. Date: Jun. 25, 2020

(65) Prior Publication Data
US 2021/0362180 A1 Nov. 25, 2021

(30) Foreign Application Priority Data
Dec. 20, 2018 (EP) .................................... 18214596

(51) Int. Cl.
| | | |
|---|---|---|
| *B05D 1/02* | (2006.01) | |
| *B05D 3/12* | (2006.01) | |
| *C09D 163/00* | (2006.01) | |
| *C08K 3/40* | (2006.01) | |
| *C09D 7/61* | (2018.01) | |
| *C09D 7/20* | (2018.01) | |
| *B05D 3/02* | (2006.01) | |
| *C08K 7/28* | (2006.01) | |

(52) U.S. Cl.
CPC ................. *B05D 1/02* (2013.01); *B05D 3/12* (2013.01); *C08K 3/40* (2013.01); *C09D 7/20* (2018.01); *C09D 7/61* (2018.01); *C09D 163/00* (2013.01); *B05D 3/0254* (2013.01); *B05D 2401/10* (2013.01); *B05D 2504/00* (2013.01); *B05D 2601/22* (2013.01); *C08K 7/28* (2013.01); *C08K 2201/005* (2013.01)

(58) Field of Classification Search
CPC .......... B05D 1/02; B05D 3/12; B05D 3/0254; B05D 2401/10; B05D 2504/00; B05D 2601/22
See application file for complete search history.

(56) References Cited

U.S. PATENT DOCUMENTS

| | | | | |
|---|---|---|---|---|
| 6,120,837 A | * | 9/2000 | Atsuyo | ................... C09D 5/002 427/256 |
| 2002/0064596 A1 | * | 5/2002 | Morton | ................. B05B 12/084 118/313 |
| 2006/0157243 A1 | | 7/2006 | Nguyen | |
| 2016/0090503 A1 | * | 3/2016 | Wehner | .................... C09D 7/70 204/192.1 |

FOREIGN PATENT DOCUMENTS

| | | |
|---|---|---|
| LT | 6283 B | 7/2016 |
| WO | 97/08252 A1 | 3/1997 |
| WO | 02/16519 A2 | 2/2002 |
| WO | WO-0216519 A2 * | 2/2002 ........... C09D 163/00 |
| WO | 2014/180463 A2 | 11/2014 |

OTHER PUBLICATIONS

Search Report of Corresponding EP Application No. 18214696.1, dated Jul. 19, 2019.
International Search Report and Written Opinion of PCT/EP2019/075310, dated Dec. 12, 2019.

* cited by examiner

*Primary Examiner* — Dah-Wei D. Yuan
*Assistant Examiner* — Kristen A Dagenais-Englehart
(74) *Attorney, Agent, or Firm* — Pauly, DeVries Smith & Deffner LLC

(57) ABSTRACT

The invention relates to a process for hot-spraying a non-aqueous two-component filler coating composition comprising a binder component (A) and a curing component (B) onto a substrate wherein binder component (A) comprises an epoxy resin and curing component (B) comprises a curing agent for curing the epoxy resin and wherein the filler coating composition comprises in the range of from 15 to 35 wt % hollow glass microspheres having an average density in the range of from 0.23 to 0.70 g/cm³ and a mean particle size of at most 52 μm, in the range of from 0 to 15 wt % inorganic solid material other than hollow glass microspheres, and in the range of from 0 to 20 wt % organic solvent.

14 Claims, No Drawings

PROCESS FOR SPRAY-APPLYING A NON-AQUEOUS TWO-COMPONENT FILLER COATING COMPOSITION ONTO A SUBSTRATE

CROSS-REFERENCE TO RELATED APPLICATIONS

This application is a 35 U.S.C. § 371 national phase application of PCT Application No. PCT/EP2019/075310 (WO 2020/126134 A1), filed on Sep. 20, 2019, which claims the benefit of priority to EP Application No. 18214596.1, filed on Dec. 20, 2018, each of which is incorporated herein by reference in its entirety.

FIELD OF THE INVENTION

The present invention relates to a process for spray-applying a non-aqueous two-component filler coating composition onto a substrate.

BACKGROUND OF THE INVENTION

In the manufacturing and repair of structural assemblies, in particular yacht hulls or yacht superstructures, it is common to use coating compositions for filling and shaping surfaces to obtain smooth surfaces that appear "fair" to the eye and touch. Such coating compositions are often referred to as 'filler' or 'fairing compound'. Likewise, such filler coating compositions are used in the repair and manufacturing of automobiles, architectural constructions, rotor blades for wind turbines, and molded structures.

For yachts, glossy external surfaces are often desired. To achieve this, the surface on which a glossy finish coat is applied needs to be even and smooth. Vessel hulls are typically assembled from several metal sheets, such as steel or aluminium sheets, or fiber-reinforced polymer sheets. The surface of the resulting assembly typically exhibits welding seams or other irregularities. The entire hull and superstructure of a yacht is therefore typically processed manually with a filler or a fairing compound to obtain a smooth surface free of defects, before applying further coating layers such as one or more of a primer, tie-coat, base coat, topcoat, or finish coat. The application of filler with a thickness of up to several centimeters may be necessary to obtain the desired even and smooth surface. Filler coating composition is usually hand-applied using a trowel. Once applied, the filler coating composition is levelled, in a process called screeding or fairing, typically using a device with a straight edge (a screed) to give a smooth surface. Sometimes multiple applications of filler coating composition are needed, with curing and sanding between coats, to achieve the desired smooth surface. The filler coating surface is optionally sanded once the filler coating composition has hardened and further coating layers such as one or more of a primer, tie-coat, base coat, topcoat, or finish coat are applied to the sanded hardened filler.

Filler compositions for 'fairing' a surface are typically two-component coating compositions comprising a binder component and a curing component, which are mixed shortly before application. The binder component comprises a film-forming resin (binder polymer); typically an epoxy resin. The curing component comprises a curing agent reactive with functional groups of the film-forming resin. Once the two components are mixed, a crosslinking reaction between a functional group of the film-forming resin and the curing agents occurs and the viscosity increases over time, up to a point at which the coating composition becomes too viscous to be applied. The pot life of the coating composition—the time during which a composition can be applied at a temperature in the range of from 15° C. to 25° C. without the viscosity increasing as a result of crosslinking reactions to an extent that application is no longer possible—needs to be long enough to allow homogeneous mixing of its two components and to allow uniform application and screeding.

The viscosity of a filler composition for fairing needs to be sufficiently high to allow for correct application, hold up to the desired thickness, and allow for correct screeding; all needed to achieve a smooth surface.

Hand application has several drawbacks. Hand application is labour intensive. Due to limited pot life, only a relatively small surface area can be coated per batch of coating composition. The viscosity of the coating composition needs to be sufficiently high to allow hand application on a vertically-extending surface to achieve the required thickness and without the material dropping off the trowel or the surface. Applying such high viscosity composition requires skilled labourers to avoid air pockets and other defects in the hardened filler coating.

Air pockets which are not removed may lead to weaknesses in the filler coating and to early failure in service.

Attempts to apply filler coating compositions by means of spray application have been described. For example, WO 2014/180463 describes a filler coating composition for use in spray application. The filler coating compositions of WO 2014/180463 comprise a binder component comprising an epoxy resin and a curing component comprising an epoxy-resin hardener. Both the binder component and the curing component comprise polymeric (plastic) hollow bodies. In the comparative example of WO 2014/180463, plastic hollow spheres are replaced by hollow spheres of glass in a further similar composition. The composition with hollow spheres of glass shows higher density and a significant increase in density after mechanical mixing, an indication of mechanical damage to the hollow glass spheres.

Plastic hollow microspheres have poor solvent resistance and are therefore susceptible for attack from solvent of adjacent layers. Further, plastic hollow microspheres can expand when heated.

In WO 02/16519 is disclosed a coating composition for thermally insulating gas and oil pipes that can be applied in a dry film thickness of up to 600 μm per layer. The coating composition comprises an epoxy-based binder and hollow microspheres. The coating composition may be applied by any usual technique used in the paint field, such as brush, roller and spraying. In the examples of WO 02/16519 coating compositions comprising about 8 to 12 wt % hollow glass beads are spray-applied.

There is a need for a process for spray application of non-aqueous filler coating compositions in which filler coating composition can be applied in high build, i.e. a high film thickness per application layer, without resulting in sagging of the applied filler, and resulting in a hardened filler coat of relatively low density that can be easily sanded.

SUMMARY OF THE INVENTION

It has now been found that a non-aqueous two-component epoxy-based filler coating composition comprising hollow glass microspheres can be applied by hot spraying at the desired high build without resulting in sagging of the applied coating, by carefully selecting the amount and type of ingredients in the filler coating composition, in particular the amount and type of inorganic solid material and solvent.

Accordingly, the invention provides a process for applying a non-aqueous two-component filler coating composition comprising a binder component (A) and a curing component (B) onto a substrate, the process comprising:

i) heating at least one of the binder component (A) and the curing component (B) to a temperature in the range of from 40 to 140° C., preferably of from 50 to 90° C.;
ii) subsequently mixing the binder component (A) and the curing component (B) to obtain hot filler coating composition;
iii) spraying the hot filler coating composition obtained in step ii) onto the substrate to obtain a filler coating layer having a wet film thickness in the range of from 1 to 30 mm;
iv) optionally spraying further hot filler coating composition obtained in step ii) to obtain one or more further filler coating layers having a wet film thickness in the range of from 1 to 30 mm; and
v) allowing the filler coating layer(s) obtained in step iii) and, if present, in step iv) to cure to obtain a cured filler coating, wherein the binder component (A) comprises an epoxy resin and the curing component (B) comprises a curing agent for curing the epoxy resin and wherein the filler coating composition comprises:

a) in the range of from 15 to 35 wt % hollow glass microspheres, wherein the hollow glass microspheres have an average density in the range of from 0.23 to 0.70 g/cm$^3$ and a mean particle size of at most 52 µm;
b) in the range of from 0 to 15 wt %, preferably of from 1 to 10 wt %, inorganic solid material other than hollow glass microspheres; and
c) in the range of from 0 to 20 wt % organic solvent.

The process according to the invention has several advantages over prior art processes. It results in a high build coating; coating layers with a wet film thickness in the range of from 1 to 30 mm are obtained. The relatively low density of the filler coating composition is maintained during spraying. If more than one layer of filler coating composition is to be applied, the further layers can be applied 'wet-on-wet', i.e. a subsequent layer is applied on a previous layer that has not yet completely hardened, resulting in a significantly quicker application process. It has been found that no unacceptable sagging of applied filler coating composition occurs when the filler coating composition is applied to vertically-extending substrates. Without wishing to be bound to any theory, it is believed that sagging is avoided since the filler coating composition maintains a relatively low density during the spraying step. The cured filler coating obtained in step v) is easily to sand.

The process according to the invention results in a smooth and uniform filler coating that can be sanded well with an orbital sander in a time that is deemed acceptable to an applicator. Compared to hand-applied coatings, it can be applied significantly quicker with less labour and requiring less skill.

DETAILED DESCRIPTION OF THE INVENTION

The process according to the invention is a process for applying a non-aqueous two-component filler coating composition comprising a binder component (A) and a curing component (B) onto a substrate.

The process comprises heating step i) wherein at least one of the binder component (A) and the curing component (B) is heated to a temperature in the range of from 40 to 140° C., preferably of from 50 to 90° C., more preferably of from 50 to 70° C. In subsequent mixing step ii), the binder component (A) and the curing component (B) are mixed to obtain hot filler coating composition. Hot filler coating composition obtained in step ii) is sprayed onto the substrate in spraying step iii) such that a filler coating layer having a wet film thickness in the range of from 1 to 30 mm is obtained. Optionally, one or more further filler coating layers with a wet film thickness in the range of from 1 to 30 mm are applied onto the first filler coating layer.

Reference herein to wet film thickness is to the thickness of the applied coating directly after application, measured according to method 1A in ISO 2808:2007.

The desired build of 1 to 30 mm can be achieved since the filler coating composition has a relatively high viscosity. Preferably both the binder component (A) and the curing component (B) have a viscosity, as measured by means of a rotational viscometer at a shear rate of 1 s$^{-1}$ and a temperature of 23° C., in the range of from 150 to 500 Pa·s, more preferably of from 200 to 450 Pa·s.

Preferably, the binder component (A) and the curing component (B) have a comparable viscosity at a given temperature. Preferably, the ratio between the viscosity of the binder component (A) and the viscosity of the curing component (B) at a given temperature is in the range of from 2:1 to 1:2, more preferably of from 1.5:1 to 1:1.5, even more preferably of from 1.2:1 to 1:1.2.

It will be appreciated that the viscosity of the filler coating composition and of its components depends to a large extend on its composition, in particular the type and amounts of resin, curing agent, hollow glass microspheres, other inorganic solid materials, solvent, or any diluents. In order to achieve comparable viscosity of the binder component (A) and the curing component (B), it is preferred that both the binder component (A) and the curing component (B) comprise hollow glass microspheres.

The viscosity is determined using a rotational viscometer (Brookfield type) following ASTM D2196-10.

In heating step i), at least one of the binder component (A) and the curing component (B) is heated to a temperature in the range of from 40 to 140° C., preferably of from 50 to 90° C. Preferably both the binder component (A) and the curing component (B) are heated. Preferably, the component(s) is/are heated to such temperature that the hot filler composition obtained in subsequent mixing step ii) has a temperature of at least 40° C. A lower temperature makes it difficult to mix the components and to spray the mixed components, since the viscosity may be too high. Preferably, both components are heated to a temperature of at least 50° C. Heating any of the components to a temperature above 140° C. is undesired as it will result, upon mixing, in a fast crosslinking reaction between resin and curing agent and therewith in high viscosity. This may make spraying more difficult and may be detrimental to the properties of the applied filler coating layer. In one embodiment both the binder component (A) and the curing component (B) are heated to a temperature in the range of from 50 to 90° C., more preferably of from 50 to 70° C. The binder component (A) and the curing component (B) may each be heated to the same temperature or to a different temperature. Heating to different temperatures may be useful to control the viscosity of each of the components. Heating to the same temperature avoids undesired temperature gradients upon mixing the hot components in mixing step ii).

In subsequent mixing step ii), the binder component (A) and the curing component (B) are mixed to obtain a sprayable hot filler coating composition. The binder component (A) and the curing component (B) may be mixed at any suitable ratio, preferably at a weight ratio in the range of from 5:1 to 0.5:1, more preferably of from 2:1 to 0.8:1.

It will be appreciated that some cooling of the heated component(s) may occur between heating step i) and mixing step ii). Preferably, heat losses are prevented and the temperature of heated component(s) maintained, for example by using insulation jackets.

The viscosity of the filler coating composition obtained upon mixing depends inter alia on its temperature and the degree of curing. During mixing, the viscosity will typically increase due to curing. Too high temperatures should be avoided since these may accelerate the curing process resulting in further increase of the viscosity of the mixed components. Preferably, the temperature of the hot components and of the hot filler coating composition obtained in mixing step ii) is in the range of from 40 to 90° C., more preferably of from 50 to 70° C. Heating may be applied during mixing to maintain or achieve the desired temperature.

In spraying step iii), the hot filler coating composition obtained in mixing step ii) is sprayed onto the substrate such that a filler coating layer having a wet film thickness in the range of from 1 to 30 mm is obtained, preferably in the range of from 5 to 25 mm. Hot spraying is done by techniques in the art, for examples by airless spray.

Spraying may be carried out at any suitable pressure, preferably at a pressure in the range of from 1,000 to 7,000 psi (6.9 to 48.3 MPa), more preferably of from 3,000 to 6,000 psi (20.7 to 41.4 MPa). Spraying is preferably carried out at a temperature in the range of from 40 to 90° C., more preferably of from 50 to 70° C. In a preferred embodiment, both components (A) and (B) are heated in step (i) to a heating temperature and the heating temperature is maintained during mixing and spraying.

Steps i), ii), and iii), i.e. heating, mixing and spraying, may be carried out in a single apparatus or in separate apparatuses. It is preferred to keep the time between mixing and spraying as short as possible, to minimize a significant viscosity increase due to curing before spraying. Therefore, steps i) to iii) are preferably carried out in a single apparatus, for example in a twin-feed airless sprayer. Twin-feed airless sprayers are well-known in the art. A typical twin-feed airless sprayer comprises two separate double-walled containers that can be heated, a mixing chamber, and a spraying gun. Hot components are fed from the containers to the mixing chamber and mixed hot components are fed to the spray gun. In the spray gun, the mixture is atomized through a nozzle at elevated pressure. Examples of commercially available twin-feed airless sprayers include Graco XM70 Plural Component Sprayer, WIWA DUOMIX sprayers, and WIWA Fleximix sprayers.

In case a single application of filler coating composition is sufficient to obtain a sufficiently smooth surface, the filler coating layer obtained in step iii) is allowed to cure in curing step v).

In case one or more further applications are needed to obtain a surface without irregularities, for example in case of larger irregularities in the substrate, further filler coating layer(s) with a wet film thickness in the range of from 1 to 30 mm, preferably of from 5 to 25 mm, may be sprayed onto the already applied filler coating layer obtained in step iii) in optional further spraying step iv). Further spraying step iv) may be repeated until a filler coating is achieved that provides sufficient surface smoothness. Any further filler coating layer may be applied on a previous filler coating layer after curing and sanding of such previous filler coating layer. Preferably, hot filler coating composition is sprayed in step iv) onto an uncured or partially cured filler coating layer ('wet-on-wet'). It has been found that the process according to the invention results in homogeneously applied filler coating layers without air pockets. Therefore, drying and/or sanding of a filler coating layer before applying one or more further layers is generally not required. As a result, any further layer can be applied before the previous layer is completely hardened, i.e. wet-on-wet, thus allowing for a much quicker application process. Typically, the filler coating layer obtained in step iii) will be screeded before applying a further layer in step iv). Reference herein to an uncured or partially cured filler coating layer is to a filler layer that has not yet cured to the extent that it is sandable.

In curing step v), the filler coating layer(s) obtained in step iii) and, if present, in step iv) are allowed to cure to obtain a cured filler coating. If desired, the applied filler coating composition is screeded whilst still wet. The filler coating layer(s) are typically allowed to cure by drying at ambient conditions.

The process may further comprise sanding the cured filler coating obtained in step v) and applying further coating layers (coating layers other than filler coating layers) onto the sanded coating layer. Such further coating layers are applied for protecting the substrates against weathering, wear, fouling, and other influences. Any coating scheme known in the art may be applied on the cured filler coating, for example: a primer coat, a base coat and a clear coat as finish coat; a primer coat, a tie-coat and an anti-fouling topcoat; or a primer coat and a protective topcoat. Suitable coating schemes for various applications are well known in the art.

The process according to the present disclosure may be used for applying a filler coating on any suitable substrate. Examples of suitable substrates include a hulls or superstructures of watercrafts such as a vessel, boat, ship or yacht, rotor blades of wind turbines, architectural surfaces, surfaces of aircrafts, cars or other vehicles or of its components, and surfaces of molded structures. The substrate may be of any suitable material, for example metal, wood, a polymer material, or a composite material such as fiber-reinforced polymeric material, in particular fiber-reinforced polyester- or epoxy-based polymeric materials. The process is particularly suitable for fairing yacht hulls or hulls of other watercrafts and for fairing rotor blades of wind turbines. The process allows easy and quick application of a relatively thick filler coating layer which is substantially devoid of sagging and air pockets.

The filler coating composition used in the process according to the invention is a non-aqueous filler coating composition. This means that the ingredients of the coating composition may be provided, e.g. dissolved or dispersed, in a non-aqueous liquid medium. The filler coating composition may comprise up to 20 wt % of an organic solvent to achieve the desired application viscosity. Herein, benzyl alcohol is considered an organic solvent. Alternatively, the filler coating composition may be free of organic solvent, for example when the curable epoxy resin and curing agent(s), optionally after addition of a reactive diluent and/or liquid plasticizer, are liquids of sufficiently low viscosity. The filler coating composition may comprise a small amount of water, for example water unintentionally introduced with ingredients of the filler coating composition, such as pigments or organic solvents which contain low amounts of water as impurity. The filler coating composition preferably comprises less than 2 wt % of water, more preferably less than 1 wt %, based on the total weight of the composition. Even more preferably, the composition is free of water.

The filler coating composition is a two-component composition comprising a binder component (A) and a curing component (B). Binder component (A) comprises an epoxy resin as curable binder polymer. The epoxy resin may be any suitable epoxy resin. Such resins are known in the art. The epoxy resin may for example be a bisphenol A epoxy resin, a bisphenol F epoxy resin, a bisphenol NF epoxy resin, or a Novolac epoxy resin.

The filler coating composition may further comprise an epoxy reactive diluent, preferably in binder component (A). Such diluents are known in the art and include aliphatic or aromatic mono-, di- or tri-functional glycidyl ethers.

Preferably, the epoxy reactive diluent is a diglycidyl ether of hexanediol, a diglycidyl ether of butandiol, or a monoglycidyl ether of an aliphatic alcohol having 10 to 20 carbon atoms.

Binder component (A) may comprise one or more curable binder polymers other than epoxy resin. Preferably, binder component (A) comprises less than 20 wt %, more preferably less than 10 wt %, even more preferably less than 1 wt % of curable binder polymers other than epoxy resin. In one embodiment, binder component (A) is free of any curable binder polymers other than the epoxy resin.

Curing component (B) comprises a curing agent for curing the epoxy resin. Such curing agents are known in the art and include compounds containing amine or amide groups, thiol groups, carboxylic acid groups, anhydride groups, or hydroxyl groups. Preferably, the curing agent is a compound comprising an NH-group, such as an amine or an amide, or a compound comprising a thiol group.

A curing agent comprising an NH-group selected from compounds comprising an amine group, an amide group, and both an amine group and an amide group (e.g. amido amines), is particularly preferred. Such curing agents include aliphatic, cycloaliphatic and aromatic amines, amides, amidoamines and mixtures thereof.

The curing component (B) may further comprise a curing accelerator, for example a tertiary amine such as 2,4,6-tris (dimethylaminomethyl)phenol.

The total amount of epoxy resin and curing agent for curing the epoxy resin in the filler coating composition will typically be in the range of from 35 to 70 wt %, preferably of from 40 to 65 wt %, more preferably of from 45 to 60 wt %, based on the total weight of the filler coating composition, i.e. the combined weight of components (A) and (B).

The filler coating composition further comprises:
a) in the range of from 15 to 35 wt % hollow glass microspheres, wherein the hollow glass microspheres have an average density in the range of from 0.23 to 0.70 g/cm$^3$ and a mean particle size of less than 52 μm;
b) in the range of from 0 to 15 wt % inorganic solid materials other than hollow glass microspheres; and
c) in the range of from 0 to 20 wt % organic solvent.

All weight percentages are based on the total weight of the filler coating composition.

It has been found that if the amounts of hollow glass microspheres, further inorganic solid materials, and organic solvent are in the ranges as specified and the hollow glass microspheres have a density and particle size as specified, a filler coating composition is obtained that has a sufficient high viscosity to achieve a high build coating layer and is suitable to be sprayed by hot twin-feed airless spraying without significant crushing of the hollow glass microspheres. Thus, a dried filler coating layer with a relatively low density can be obtained. Filler coating with a low density is for example desired on yacht hulls and superstructures, rotor blades of wind turbines, and in aircraft and automotive applications. A low density of the filler coating will also help avoiding gravity-induced sagging of the applied wet coating on vertically-extending surfaces, in particular when thick layers are to be applied.

The density of the dried filler coating is preferably in the range of from 0.4 to 1.2 g/cm$^3$, more preferably of from 0.6 to 1.0 g/cm$^3$, even more preferably of from 0.7 to 0.9 g/cm$^3$. Reference herein to the density of the dried filler coating is to the density after drying for 7 days at 23° C. at 50% relative humidity. The density is calculated from the volume of the dried coating as measured by volume displacement and the weight of the coating as determined gravimetrically.

The hollow glass microspheres have an average density in the range of from 0.23 to 0.70 g/cm$^3$, preferably of from 0.27 to 0.65 g/cm$^3$. Reference herein to density of the hollow glass microspheres is to the true density, i.e. the density as determined by means of gas replacement. The hollow glass microspheres have a mean particle size of at most 52 μm, preferably at most 50 μm. Typically, the mean particle size will be at least 10 μm, preferably at least 15 μm, more preferably at least 20 μm. Reference herein to the mean particle size is to the D50 by volume, i.e. 50% of the total volume of the hollow glass microspheres has a particle size below the D50 values and 50% of the total volume of the hollow glass microspheres has a particle size above the D50 value. The mean particle size can suitable be determined by laser diffraction according to ISO 13320, using the Mie theory.

Such hollow glass microspheres are known in the art and commercially available, for example 3M™ Glass Bubbles S38, S38HS, S38XHS, K46, K42HS, S60, S60HS, Eccospheres SID-270Z, SID-311Z, SID350Z, and Sphericel 34P30.

The filler coating composition comprises in the range of from 15 to 35 wt % of hollow glass microspheres, preferably of from 20 to 35 wt %, more preferably of from 22 to 33 wt %.

The hollow glass microspheres may be present in the binder component (A) and/or in the curing component (B). Preferably, both the binder component (A) and the curing component (B) comprise hollow glass microspheres, more preferably in such amounts that the absolute difference in weight percentage of hollow glass microspheres in the binder component (A) and in the curing component (B) is less than 10 wt % (weight percentages based on the weight of the component).

The filler coating composition may comprise inorganic solid material other than hollow glass microspheres in an amount up to 15 wt %, preferably in an amount in the range of from 1 to 10 wt %, even more preferably of from 3 to 8 wt %. Such inorganic solid material b) may include fillers (extenders), color pigments, and inorganic rheology control additives. Examples of suitable inorganic solid material include fillers such as talc, quartz, kaolin, dolomite, barium sulphate, calcium carbonate, calcite, cristobalite flour, silica, wollastonite, mica; inorganic color pigments such as titanium dioxide, iron oxides and other metal oxides; and rheology modifying additives such as clays and hydrophobic fumed silica.

Preferably, the total amount of hollow glass microspheres and inorganic solid materials b) is in the range of from 25 to 40 wt %.

Preferably, the filler coating composition is free of polymeric hollow microspheres.

The filler coating composition may comprise up to 20 wt % organic solvent, preferably of from 1 to 15 wt % organic solvent, even more preferably of from 3 to 12 wt %.

Preferably, the filler coating composition comprises less than 3 wt % organic solvent other than benzyl alcohol, more preferably less than 1 wt %, even more preferably less than 0.5 wt %.

In one embodiment, the filler coating composition used in the process according to the present disclosure comprises:
a) in the range of from 20 to 35 wt % hollow glass microspheres, wherein the hollow glass microspheres have an average density in the range of from 0.27 to 0.65 g/cm$^3$ and a mean particle size in the range of from 10 to 50 μm;
b) in the range of from 3 to 8 wt % inorganic solid material other than hollow glass microspheres; and
c) in the range of from 1 to 12 wt % organic solvent and less than 3 wt % organic solvents other than benzylalcohol.

The filler coating composition may comprise an adhesion promoter. Suitable adhesion promoters are known in the art and include functional silanes, such as epoxysilane and aminosilane. Preferably, the filler coating composition comprises an epoxysilane in its binder component (A). Typically, the concentration of adhesion promoter is in the range of from 0.5 to 3 wt %, based on the total weight of the filler coating composition.

The filler coating composition may further comprise additives known in the art of filler coating compositions. Examples of such additives are wetting agents, waxes, anti-foaming agents, rheology control additives, plasticizers, dispersing agents, surfactant, and flow additives. The filler coating composition preferably is free of any foaming agent. The use of foaming agents would not yield the desired smooth surface.

The invention is further illustrated by means of the following non-limiting examples.

EXAMPLES

Binder components (A) with a composition as given Table 1 were prepared by mixing the ingredients. Curing components (B) with a composition as given Table 2 were prepared by mixing the ingredients.

Filler coating compositions were prepared and sprayed onto vertically orientated MDF test panels as follows.

Components A and B were each heated to a temperature of about 60° C. and then each sent through a heated line to a mix manifold were the components are mixed and sprayed out of a Graco XHF spray gun at static pressure in the range of from 3,000 to 6,000 psi (20.7 to 41.4 MPa) onto the test panel.

Different filler coating compositions were prepared. Filler coating composition was sprayed onto the panels in such thickness that no sagging occurred. In Table 3 is shown for the different filler coating compositions: the mix ratio of the two components; the temperature of the components supplied to mix manifold; and the applied wet film thickness. None of the coatings sagged at the applied wet film thickness. None of the applied coatings showed air pockets. All applied coatings were easy to screed, easy to sand after curing, and provided a smooth coating. For some of the coatings it was determined at which wet film thickness sagging started to occur.

TABLE 1

| Composition of binder component A (in wt %) | | A1 | A2 | A3 | A4 |
|---|---|---|---|---|---|
| Epoxy resin | DER 351 | 62 | 64 | 64 | 61 |
| Reactive diluent | Monoglycidyl ether of C13-C15 aliphatic alcohol | 7.3 | 7.6 | 7.5 | 7.2 |
| Adhesion promoter | Gamma-glycidoxypropyl-trimethoxy silane | | | | 1.9 |
| Wetting agent | | 0.5 | 0.5 | 0.5 | 0.5 |
| Thixotrope | Hydrophobic fumed silica | 4.0 | 4.6 | 2.9 | 4.8 |
| Thixotrope | Modified clay | | | 2.7 | |
| Hollow glass microspheres[1] | 3M Glass Bubbles S38HS | | 23 | 23 | 24 |
| Hollow glass microspheres[2] | 3M Glass Bubbles K46 | 26 | | | |
| Viscosity at 23° C., 1 s$^{-1}$ (in Pa · s) | | 304 | 360 | 424 | 272 |

[1]3M Glass Bubbles S38HS: average density 0.38 g/cm$^3$; D50(v) is 44 μm.
[2]3M Glass Bubbles K46: average density 0.46 g/cm$^3$; D50(v) is 40 μm.

TABLE 2

| Composition of curing component B (in wt %) | | B1 | B2 | B3 | B4 | B5 | B6 | B7 |
|---|---|---|---|---|---|---|---|---|
| Curing agent | Polyamidoamine in benzyl alcohol | 28 | 30 | 14 | 22 | 13 | 14 | 14 |
| Curing agent | Polyamine in benzyl alcohol | 23 | 25 | 50 | 29 | 46 | 49 | 48 |
| Accelerator | 2,4,6-Tris(dimethylaminomethyl)phenol | 2.0 | 2.1 | 2.1 | 1.8 | 1.9 | 2.1 | 2.1 |
| Solvent | Benzyl alcohol | 3.2 | 3.5 | 1.6 | 3.4 | 1.5 | 1.6 | 1.6 |
| Thixotrope | Hydrophobic fumed silica | 4.0 | 4.9 | 4.6 | 3.7 | 5.5 | 6.0 | 6.4 |
| Pigment/filler | Titanium dioxide | 1.8 | 3.3 | 1.6 | 2.0 | 1.4 | 1.6 | 1.5 |
| Filler | Calcium carbonate | 3.2 | 3.5 | | | | | |
| Color pigment | | | 0.04 | 0.03 | 0.03 | 0.03 | 0.03 | 0.03 |
| Hollow glass microspheres[1] | 3M Glass Bubbles S38HS | | 31 | 26 | | 31 | 26 | 26 |
| Hollow glass microspheres[2] | 3M Glass Bubbles K46 | 35 | | | 35 | | | |
| Total benzyl alcohol content | | 13 | 14 | 21 | 14 | 20 | 21 | 21 |
| Viscosity at 23° C., 1 s$^{-1}$ (Pa · s) | | 376 | 360 | 160 | 240 | 224 | 307 | 368 |

TABLE 3

| Coating compositions and its properties | | | | | | | | | | |
|---|---|---|---|---|---|---|---|---|---|---|
| | C1 | C2 | C3 | C4 | C5 | C6 | C7 | C8 | C9 | C10 |
| Binder component | A1 | A2 | A1 | A2 | A2 | A2 | A2 | A3 | A4 | A4 |
| Curing component | B1 | B3 | B4 | B2 | B5 | B6 | B6 | B2 | B6 | B7 |
| Volume mix ratio | 1:1 | 1.5:1 | 1:1 | 1:1 | 1.3:1 | 1.5:1 | 1.5:1 | 1:1 | 1.3:1 | 1.3:1 |
| Weight mix ratio | 1.11:1 | 1.61:1 | 1.11:1 | 1.14:1 | 1.47:1 | 1.6:1 | 1.6:1 | 1.14:1 | 1.36:1 | 1.36:1 |
| Temperature component A (° C.) | 55 | 52 | 60 | 60 | 55 | 60 | 68 | 65 | 60 | 60 |
| Temperature component B (° C.) | 51 | 56 | 60 | 60 | 55 | 60 | 68 | 65 | 60 | 60 |
| Wet film thickness (mm) | 10 | 10 | 20 | 20 | 30 | 15 | 20 | 30 | 10 | 15 |
| Wet film thickness at which sagging was observed (mm) | | 15 | 22 | 22 | 20 | | | | | |

The invention claimed is:

1. A process for applying a non-aqueous two-component filler coating composition comprising a binder component (A) and a curing component (B) onto a substrate, the process comprising:
   i) heating at least one of the binder component (A) and the curing component (B) to a temperature in the range of from 40 to 140° C.;
   ii) subsequently mixing the binder component (A) and the curing component (B) to obtain a hot filler coating composition;
   iii) spraying the hot filler coating composition obtained in step ii) onto the substrate to obtain a filler coating layer having a wet film thickness in the range of from 1 to 30 mm;
   iv) optionally spraying further hot filler coating composition obtained in step ii) to obtain one or more further filler coating layers having a wet film thickness in the range of from 1 to 30 mm; and
   v) allowing the filler coating layer(s) obtained in step iii) and, if present, in step iv) to cure to obtain a cured filler coating,
   wherein the binder component (A) comprises an epoxy resin and the curing component (B) comprises a curing agent for curing the epoxy resin and wherein the filler coating composition comprises:
   a) in the range of from 15 to 35 wt % hollow glass microspheres, wherein the hollow glass microspheres have an average density in the range of from 0.23 to 0.70 g/cm$^3$ and a mean particle size of at most 52 µm;
   b) in the range of from 0 to 15 wt % inorganic solid material other than hollow glass microspheres; and
   c) in the range of from 0 to 20 wt % organic solvent.

2. A process according to claim 1, wherein both the binder component (A) and the curing component (B) have a viscosity of 150 to 500 Pa·s, as measured by means of a rotational viscometer at a shear rate of 1 s$^{-1}$ and a temperature of 23° C.

3. A process according to claim 1, wherein the process comprises step iv) and wherein in step iv) further hot filler coating composition obtained in step ii) is sprayed onto an uncured or partially cured filler coating layer obtained in step iii) or onto an uncured or partially cured further filler coating layer obtained in step iv).

4. A process according to claim 1 further comprising:
   vi) sanding the cured filler coating obtained in step v); and
   vii) applying one or more further coating layers onto the sanded cured filler coating.

5. A process according to claim 1, wherein the substrate is a hull or superstructure of a watercraft, or a rotor blade of a wind turbine.

6. A process according to claim 1, wherein the binder component (A) is free of any curable binder polymer other than the epoxy resin.

7. A process according to claim 1, wherein the filler coating composition comprises less than 3 wt % of any organic solvent other than benzyl alcohol.

8. A process according to claim 1, wherein the filler coating composition comprises an epoxy reactive diluent.

9. A process according to claim 1, wherein the cured filler coating obtained in step v) has a density in the range of from 0.6 to 1.0 g/cm$^3$.

10. A process according to claim 1, wherein the hollow glass microspheres have an average density in the range of from 0.27 to 0.65 g/cm$^3$.

11. A process according to claim 1, wherein the hollow glass microspheres have a mean particle size of at most 50 µm.

12. A process according to claim 1, wherein the filler coating composition comprises in the range of from 20 to 35 wt % hollow glass microspheres.

13. A process according to claim 1, wherein the filler coating composition comprises in the range of from 3 to 8 wt % of inorganic solid materials other than hollow glass microspheres.

14. A process according to claim 1, wherein the filler composition comprises:
   a) in the range of from 20 to 35 wt % hollow glass microspheres, wherein the hollow glass microspheres have an average density in the range of from 0.27 to 0.65 g/cm$^3$ and a mean particle size in the range of from 10 to 50 µm;
   b) in the range of from 3 to 8 wt % inorganic solid material other than hollow glass microspheres; and
   c) in the range of from 1 to 12 wt % organic solvent and less than 3 wt % organic solvents other than benzyl alcohol.

* * * * *